United States Patent [19]
Janisch

[11] Patent Number: 5,234,195
[45] Date of Patent: Aug. 10, 1993

[54] DEVICE FOR CLOSING OFF LARGE PIPELINES

[75] Inventor: Hans-Jürgen Janisch, Beckum, Fed. Rep. of Germany

[73] Assignee: Mannesmann Aktiengesellschaft, Dusseldorf, Fed. Rep. of Germany

[21] Appl. No.: 846,565

[22] Filed: Mar. 5, 1992

[30] Foreign Application Priority Data

Mar. 6, 1991 [DE] Fed. Rep. of Germany ....... 4107175

[51] Int. Cl.$^5$ ............................................... F16K 1/22
[52] U.S. Cl. ..................................... 251/279; 251/304
[58] Field of Search ................. 251/228, 279, 289, 304

[56] References Cited

U.S. PATENT DOCUMENTS 3,877,677  4/1975  Daghe et al. ...................... 251/228
4,099,702  7/1978  Temple ............................ 251/289 X

FOREIGN PATENT DOCUMENTS 2244972  3/1974  Fed. Rep. of Germany .

Primary Examiner—John C. Fox
Attorney, Agent, or Firm—Cohen, Pontani, Lieberman, Pavane

[57] ABSTRACT

Device for closing off large pipelines, particularly hot gas pipelines, having at least one pivoted flap, the flap shaft of which is mounted for turning by a drive on a frame. The flap shaft is rotated by a double-armed swing lever connected to the flap shaft. The swing lever has two arms upon which actuating elements pivotally act. The swing lever is connected to the flap shaft through at least one intermediate element so that the swing lever is movable in a plane extending perpendicular to the axis of the flap shaft.

8 Claims, 5 Drawing Sheets

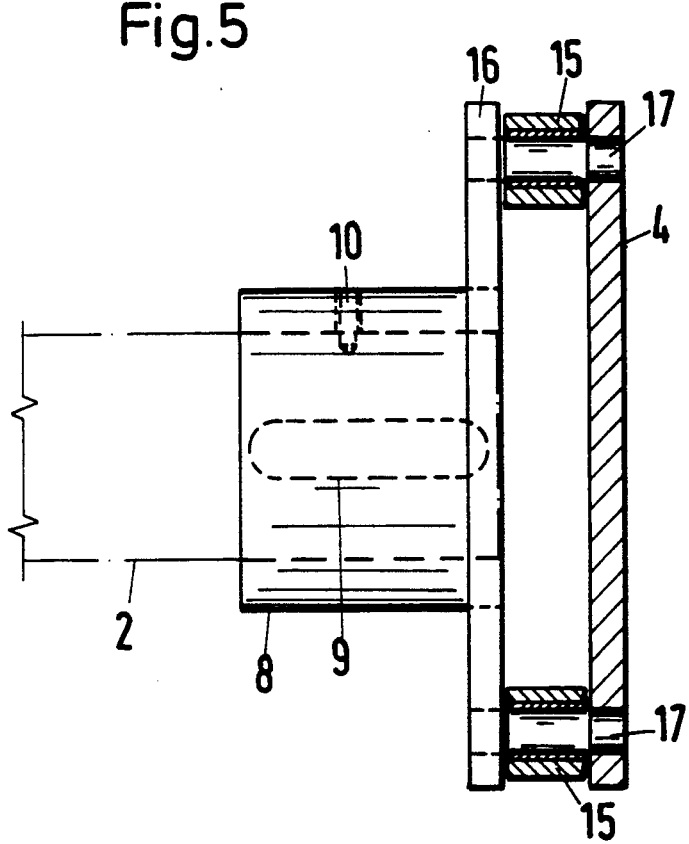

DEVICE FOR CLOSING OFF LARGE PIPELINES

BACKGROUND OF THE INVENTION

The present invention relates to a device for closing off large pipelines, in particular hot-gas pipelines. Such a device is disclosed in Federal Republic of Germany Patent No. 22 44 972. In that device, a plurality of pivoted flaps are arranged parallel to one another within a frame, and each of the flap shafts has, at its end, a straight double-armed swing lever on their arms upon which rigid connecting rods act. A drive actuates these connecting rods, which swing and/or displace the swing levers, and thus also the pivoted flaps. Each swing lever is pivotally connected through two short connecting pieces to a hub piece which is fastened on the end of a flap shaft. This articulated connection allows for the swinging or turning movement of the lever to be transmitted directly to the pivoted flaps. Additionally, thermal expansion of the frame, which enlarges the distance between the flap shafts, does not lead to undesired tensile stresses in the connecting rods because the swing levers avoid extension in length of the frame by tilting away. However, this tiling of the swing levers is limited by the length of the short connecting pieces. In particular, if pivoted flaps of widths of at least about 2 meters are used and/or several pivoted flaps are used which are parallel to one another, thermal expansion in the frame, which occurs at temperatures of, for example about 500° to about 600° C., can no longer be compensated for by the tilting away of the levers. Enormous tensile forces then occur in the connecting rods which possibly leads to damage to the connecting rods, the articulated connections, and the levers.

Lengthening of the connecting pieces between the swing lever and the hub piece on the flap shaft would result in an increase in the compensatory movement but it would also cause considerable bending and torsional forces to occur in these connecting pieces. These forces can barely be controlled, even if expensive stiffenings and ribs are used. Such a lengthening of the connecting pieces is also particularly disadvantageous because a considerable loss of structural height must be tolerated. Should the above-described disadvantages be tolerable, frequently only very little installation space is available in large pipelines so that a lengthening of the connecting pieces, can frequently not be accomplished or at least one of a sufficient degree.

SUMMARY OF THE INVENTION

The object of the present invention is to provide a device for closing off large pipelines so that, even when large flap widths are used and/or when a plurality of pivoted flaps arranged one behind the other are used in high temperature environments, dependable operation is still possible without loss of structural height.

In accordance with the invention, this object is achieved by connecting the swing lever to the flap shaft by at least one intermediate element so that the swing lever is movable in a plane perpendicular to the axis of the shaft of the pivoted flap.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

FIG. 5 is a sectional view along the line V—V of FIG. 4.

DESCRIPTION OF THE PRESENTLY PREFERRED EMBODIMENTS

Figure 1:
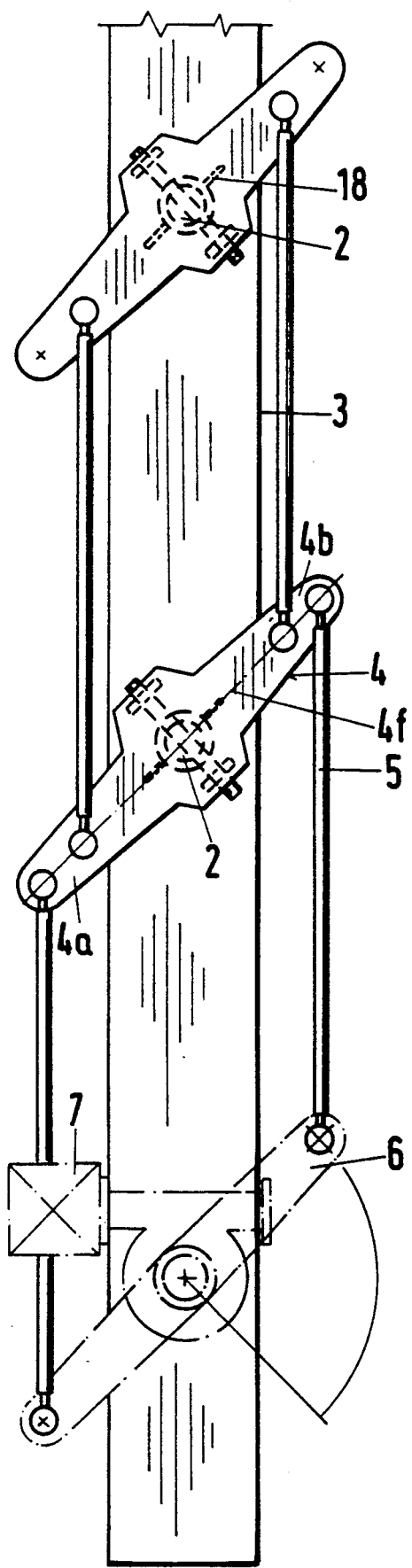
FIG. 1 is a side view of one embodiment of the device of the present invention.
Figure 2:
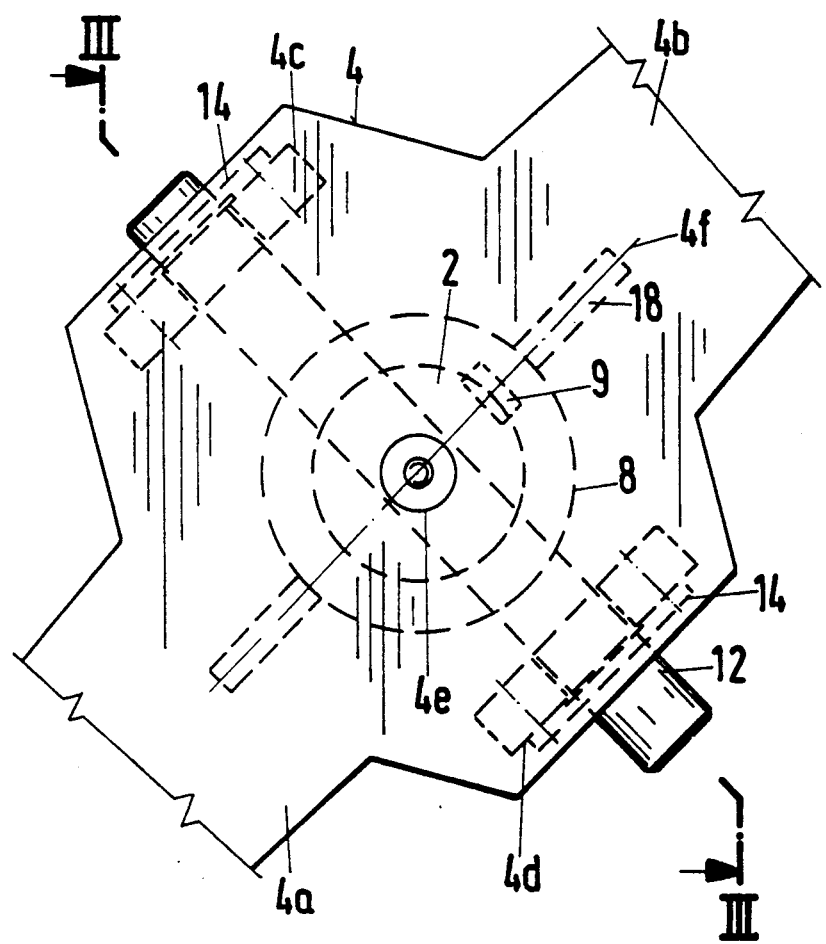
FIG. 2 is a partial view of the embodiment shown in FIG. 1.
Figure 3:
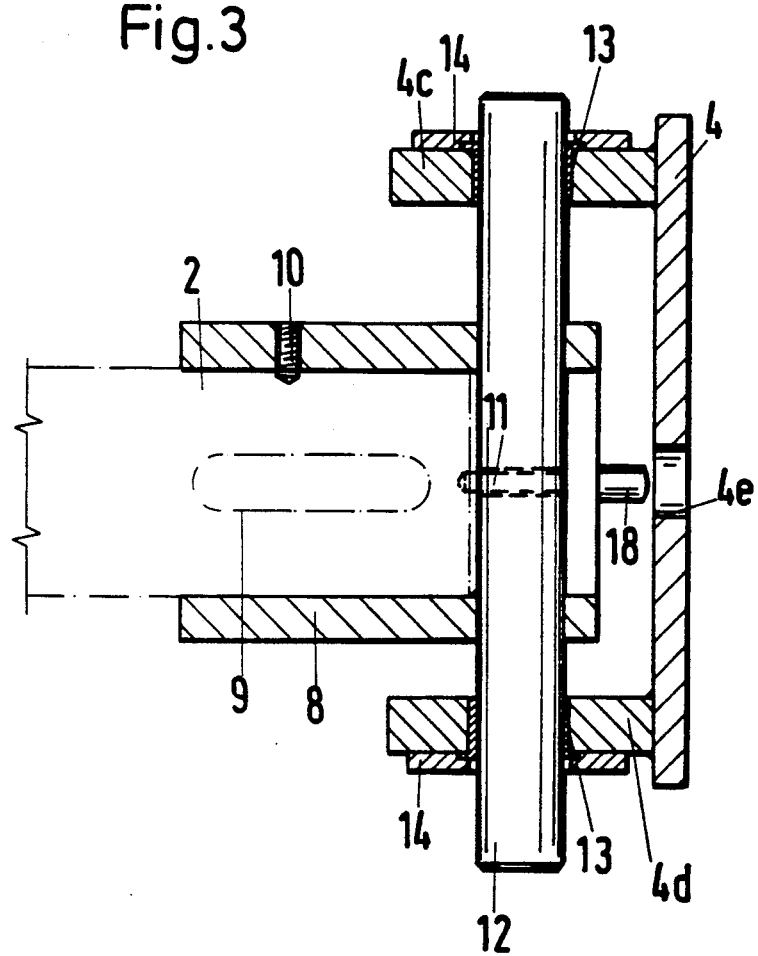
FIG. 3 is a sectional view along the line III—III of FIG. 2.

FIGS. 1 to 3 show a first embodiment of the device of the present invention for closing off of large pipelines. This device is comprised of essentially two pivoted flaps (not shown) which can be actuated by common drive 7 and flap shafts 2. The flap shafts 2 are mounted parallel to each other in frame 3. Double-armed swing lever 4 is rotatably connected to each flap shaft 2, as well as to actuating elements 5, which are preferably rods, and are pivotally connected to the two arms 4a, 4b of swing lever 4.

Also shown in broken lines in FIG. 1 is another lever 6 which is connected through actuating elements 5 to swing lever 4 positioned above lever 6. One of the actuating elements 5 and lever 6 can be moved or actuated by drive 7.

FIGS. 2 and 2 show, in particular, the connection between flap shaft 2 and swing lever 4. Hub piece 8 fits over one end of the flap shaft 2 and is secured to flap shaft 2 by a feather 9 and a grub screw 10. An intermediate piece, for example bolt 12, is pushed through hub piece 8 transverse to flap shaft 2 so that bolt 12 extends centrally over the end surface of flap shaft 2 and is fixed to its center by centering pin 11.

Swing lever 4 furthermore has attachments 4c, 4d in which bearing bushings 13 are mounted. On the other sides of the attachments 4c, 4d facing away from each other, bearing bushings 13 are enclosed by cover plates 14. Upon assembly, bolt 12 is passed through both bearing bushings 13 so that bolt 12, which is then fixed on lap shaft 2 by centering pin 11 and hub piece 8, permits a sliding displacement between swing lever 4 and flap shaft 2 in the longitudinal direction of bolt 12. Centering pin 11 is accessible through hole 4e in swing lever 4.

To prevent the turning or tilting away of swing lever 4 around bolt 12, two flatiron pieces 18, developed as ribs, are also fastened to hub piece 8.

During the operation of the above-described device for closing off of large pipelines, particularly in hot gas pipelines, the pivoted flaps and the frame 3 often attain temperatures of about 500° to about 600° C. due to the hot gas flowing through the pipeline. As a result frame 3 expands in length thereby resulting in an increase in the distance between the flaps shafts 2. However, there is no concomitant increase in the length of the connecting rods 5 and swing levers 4 which are positioned outside the central channel of the pipeline. Thus, while the distance between the flap shafts 2 changes due to thermal expansion, the distance between the swing levers 4, however, remains the same. However, this difference in distance is compensated for by the movable connection between flap shaft 2 and swing lever 4.

Figure 4:
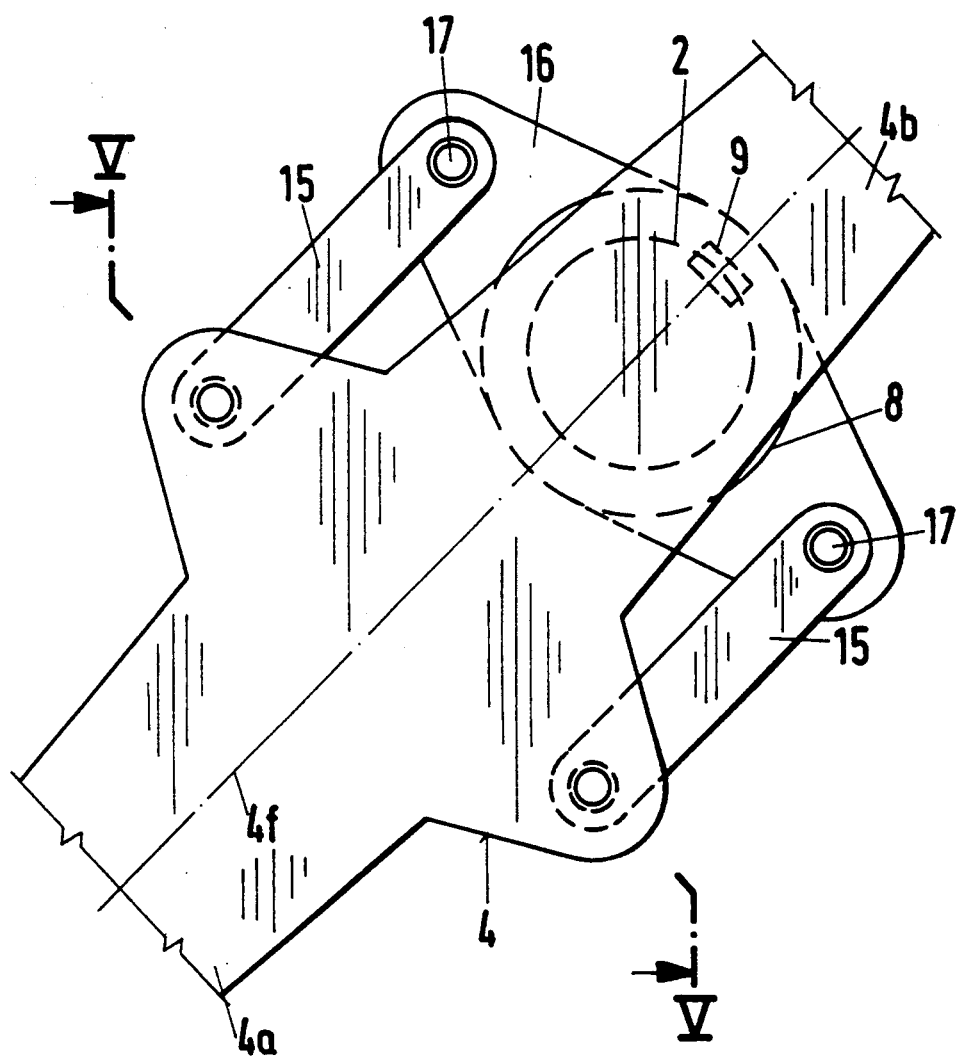
FIG. 4 is a partial view of another embodiment of the device of the present invention.

In FIGS. 4 and 5 is shown another embodiment of the device of the present invention in which the same reference numbers used in FIGS. 1 to 3 are used for identical parts. In FIGS. 4 and 5, swing lever 4 is so connected to flap shaft 2 through two intermediate elements, developed as link 15. In this embodiment, as in the embodiment shown in FIGS. 1 to 3, swing lever 4 is movable in a plane perpendicular to longitudinal axis of flap shaft 2. In this plane, transverse rocker 16 is fastened to hub piece 8. Flap shaft 2 is operatively connected to swing lever 4 by two links 15. Links 15 are rotatably mounted to both transverse rocker 16 and to swing lever 4 by short bolts 17 which extend parallel to the longitudinal axis of flap shaft 2. Links 15 are positioned in a plane perpendicular to the axis of flap shaft 2.

In both embodiments (FIGS. 1 to 3, and FIGS. 4 and 5), swing levers 4 are thermally displaced in a plane extending perpendicular to the axis of flap shaft 2 and parallel to the axis 4f of swing lever 4 due to thermal lengthening of frame 3 relative to flap shafts 2. While in the first embodiment (FIGS. 1 to 3), the individual swing levers are moved parallel to each other in a given direction, namely in the longitudinal direction of bolts 12, in the second embodiment (FIGS. 4 and 5), in addition to the parallel displacement, there is also a movement over a circular path which is superimposed thereon by links 15.

The longitudinal thermal extension produced in frame 3 can be compensated for by using devices in accordance with both of the embodiments of the present invention without the occurrence of undesired bending or torsional forces. Because swing levers 4 can be displaced in a plane perpendicular to the axis of flap shaft 2, a large space for installation is not necessary.

Thus, while there have been shown and described and pointed out fundamental novel features of the invention as applied to a preferred embodiment thereof, it will be understood that various omissions and substitutions and changes in the form and details of the disclosed apparatus, and in its operation, may be made by those skilled in the art without departing from the spirit of the invention. It is the intention, therefore, to be limited only as indicated by the scope of the claims appended hereto.

For example, in the first described embodiment, instead of using a single intermediate element developed as bolt 12, two such bolts, parallel to each other, can be used. In a device having one or more swing levers 4, one of these levers must preferably be fixed in position in order to serve as abutment for the other levers. In the first described embodiment, the lever 6 shown in FIG. 1 assumes this function. Lever 6 could, however, also be developed as swing lever 4, which then would preferably be rigidly fastened to its flap shaft.

Similarly, drive mechanisms other than the one shown on drive 7, may be used, such as, for example, a drive connected directly to the shaft on which the lever is fastened.

Additionally, the two swing levers 4 shown in FIG. 1 could also be replaced by devices with only one swing lever or with more than two swing levers.

It should be understood that the preferred embodiments and examples described are for illustrative purposes only are not to be construed as limiting the scope of the present invention which is properly delineated only in the appended claims.

What is claimed is:

1. A device for closing off a pipeline having a central channel and at least one pivoted flap rotatably mounted within the central channel of the pipeline and shaped so as to be able to close off the central channel of the pipeline, comprising:
   a flap shaft (2) fixedly connected to the pivoted flap and rotatably mounted on the pipeline and extending out of the pipeline, said flap shaft (2) having a longitudinal axis;
   an intermediate connecting element (12, 15) connected to said flap shaft (2);
   a swing lever (4) connected to said intermediate connecting element (12, 15) so that said swing lever (4) is movable relative to said flap shaft (2) in a plane perpendicular to said longitudinal axis of said flap shaft (2), said swing lever (4) having two swing arms (4a, 4b); and
   an actuating element (5) pivotally connected to at least one of said two arms (4a, 4b) of said swing lever (4).

2. The device of claim 1, wherein said intermediate connecting element comprises a bolt (12) fixedly attached to said flap shaft (2), said bolt having a longitudinal axis.

3. The device of claim 2, wherein said swing lever (4) is slidably connected to said bolt (12) so that said swing lever (4) is slidable in a direction along the longitudinal axis of said bolt.

4. The device of claim 1, further comprising a hub piece (8) which connects said flap shaft (2) to said intermediate connecting element (12, 15).

5. The device of claim 1, wherein said intermediate connecting element comprises two links (15).

6. The device of claim 5, further comprising a transverse rocker (16) fixedly connected to said flap shaft (2) and connected to each of said two links (15), and wherein each of said two links (15) are rotatably connected to said wing lever (4).

7. A device for closing off a pipeline having a central channel and at least one pivoted flap rotatably mounted within the central channel of the pipeline and shaped so as to be able to close off the central channel of the pipeline, comprising:
   a flap shaft (2) fixedly connected to the pivoted flap and rotatably mounted on the pipeline and extending out of the pipeline, said flap shaft (2) having a longitudinal axis;
   a bolt (12) connected to said flap shaft (2), said bolt (12) having a longitudinal axis;
   a swing lever (4) connected to said bolt (12) such that said swing lever (4) is movable relative to said flap shaft (2) in a plane perpendicular to said longitudinal axis of said flap shaft (2) and in a direction along the longitudinal axis of said bolt (12), said swing lever (4) having two swing arms (4a, 4b); and
   an actuating element (5) pivotally connected to at least one of said two arms (4a, 4b) of said swing lever (4).

8. The device according to claim 7, wherein said bolt (12) is fixedly attached to said flap shaft (2) and said swing lever (4) is slidable on said bolt (12).

* * * * *